United States Patent [19]

Yamamoto et al.

[11] Patent Number: 5,725,072
[45] Date of Patent: Mar. 10, 1998

[54] SPEED CHANGE GEAR DEVICE WITH LUBRICATING AUXILIARY VESSEL

[75] Inventors: Hiromitsu Yamamoto, Kodaira; Naoki Matsuo, Houya, both of Japan

[73] Assignee: Sumitomo Heavy Industries, Ltd., Tokyo, Japan

[21] Appl. No.: 763,433

[22] Filed: Dec. 11, 1996

[30]     Foreign Application Priority Data

Dec. 19, 1995 [JP] Japan ................................. 7-330284

[51] Int. Cl.$^6$ ................................................. F16H 1/00
[52] U.S. Cl. ........................ 184/6.12; 184/11.1; 184/11.2; 184/13.1; 384/478; 74/467
[58] Field of Search ............................. 184/6.12, 11.1, 184/11.2, 13.1; 74/467; 384/478

[56]        References Cited

U.S. PATENT DOCUMENTS

| | | | |
|---|---|---|---|
| 2,037,173 | 4/1936 | Matthews | 184/11.1 |
| 4,090,588 | 5/1978 | Willover | 184/11.2 |
| 4,231,266 | 11/1980 | Nishikawa et al. | 184/6.12 |
| 4,683,771 | 8/1987 | Sogo et al. | 184/6.12 |
| 4,987,974 | 1/1991 | Crouch | 184/11.1 |

*Primary Examiner*—Christopher Verdier
*Attorney, Agent, or Firm*—Nikaido Marmelstein Murray & Oram LLP

[57]         ABSTRACT

In a speed change gear device having a gear shaft (30 in FIG. 1), bearings (32A, 32B), and a housing (21) which accommodates the gear shaft and the bearings therein; lubricating auxiliary vessels (50, 60) are mounted within the housing (21) so as to catch oil scooped up from a collection of oil (P) and to introduce the received oil into the bearings (32A, 32B) not directly immersed in the collection of oil (P). The lubricating auxiliary vessels (50, 60) are arranged at positions which lie laterally and lower than the intermeshing portion of gears (38, 39). The level (PL) of the collection of oil (P) is set at a height at which the lower end (H2) of at least one (39) of the gears is immersed in the collection of oil (P). Due to the location of the lubricating auxiliary vessels (50, 60), the bearings (32A, 32B) are suppled with sufficient quantities of oil even during low-speed rotation of the gear (39).

4 Claims, 7 Drawing Sheets

SPEED CHANGE GEAR DEVICE WITH LUBRICATING AUXILIARY VESSEL

BACKGROUND OF THE INVENTION

1. Field of the Invention

The present invention relates to a speed change gear device (as a reduction gear device or a speedup gear device). More particularly, it relates to a speed change gear device which is well suited for use in connection with large-sized driving motors such as those installed in an escalator system, an elevator system, or the lift system of a ski resort.

2. Description of the Prior Art

Heretofore, a reduction gear device as shown in FIG. 6 has been known as a speed change gear device for the use specified above.

The exemplified reduction gear device includes a plurality of gear shafts 4a–4d which are assembled in a horizontal direction within housing 2. The housing 2 is a structure which is transversely split, that is, which is divided into upper and lower portions. The mating surfaces of the upper and lower portions are respectively formed with semicircular recesses. Herein, the gear shafts 4a–4d are inserted in the circular holes defined by the upper and lower recesses. Incidentally, symbols 6a–6d denote bearings which support the respective gear shafts 4a–4d so as to be rotatable, and symbols 8a and 8d denote oil seals which are placed at the parts of gear shafts 4a and 4d protruding out of housing 2.

The reason housing 2 is transversely split into upper and lower portions, is to allow gear shafts 4a–4d, including bearings 6a–6d and oil seals 8a and 8d, to be assembled easily. For this reason, the respective axes of gear shafts 4a–4d are set at identical heights (vertical positional level) H.

Meanwhile, in the reduction gear device of such a structure, the oil level PL of a collection of oil P inside housing 2 is ordinarily set in agreement with the lowermost position of the oil seal 8a which is mounted in correspondence with the gear shaft of largest diameter (4a in the illustrated example).

More specifically, the level PL of the collected oil P is set at the height at which the bearing 6a of the gear shaft of largest diameter 4a is immersed in the collected oil P, but the oil seal 8a is not immersed in the oil P. The oil P has its level PL set so as not to immerse the oil seal 8a therein, in consideration of the following facts:

(1) When the oil seal is immersed in the oil, it is liable to degrade.

(2) Even in a case where the oil seal has degraded, the oil P is to be prevented from leaking.

(3) Since the reduction gears themselves are large in size and will be immersed in oil, the quantity of oil P in the housing is to be saved as far as possible.

However, in the case where the level PL of the oil P is set on the basis of the height of the oil seal 8a corresponding to the gear shaft of largest diameter 4a in this manner, the gear shafts of smaller diameters, for example, 4c and 4d naturally undergo such states that the corresponding bearings 6c and 6d are not immersed in the oil P since all the shafts 4a–4d have the identical height H.

Therefore these bearings 6c and 6d are lubricated such that the splash of oil from gear 10 is caught by a lubricating auxiliary vessel 9 in the shape of a chute, and the oil is introduced into the specific bearing portions by the lubricating auxiliary vessel 9.

In the case where the lubricating auxiliary vessel 9 is located at a high position in order to catch the splash of oil scooped up by gear 10, the oil must be splashed into auxiliary vessel 9 in a sufficient quantity to lubricate bearings 4c and 4d. If the rotational speed of gear 10 is low, the amount of oil splashed into auxiliary vessel 9 will be inadequate to feed bearings 4c and 4d.

SUMMARY OF THE INVENTION

The present invention has been made to correct the problem of the prior art as stated above. Its object is to provide adequate lubrication to bearings in a speed change gear device even during the low-speed rotation of a gear.

The present invention has achieved the above object by adopting a structure as defined in claim 1.

In the present invention, note has been taken of the phenomenon that oil having adhered onto the tooth surface of the gear as the gear passes through collected oil is forced out laterally or sideways as the gears mesh. Therefore if the lubricating auxiliary vessel device is arranged laterally to the intermeshing portion of the gears, the oil forced out might be caught by the lubricating auxiliary vessel device and introduced into bearings requiring lubrication. Accordingly, even when the gear is rotating at a low speed, sufficient quantities of oil can be supplied to the bearings.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENT

Now, one aspect of performance of the present invention will be described with reference to the drawings.

Figure 4:
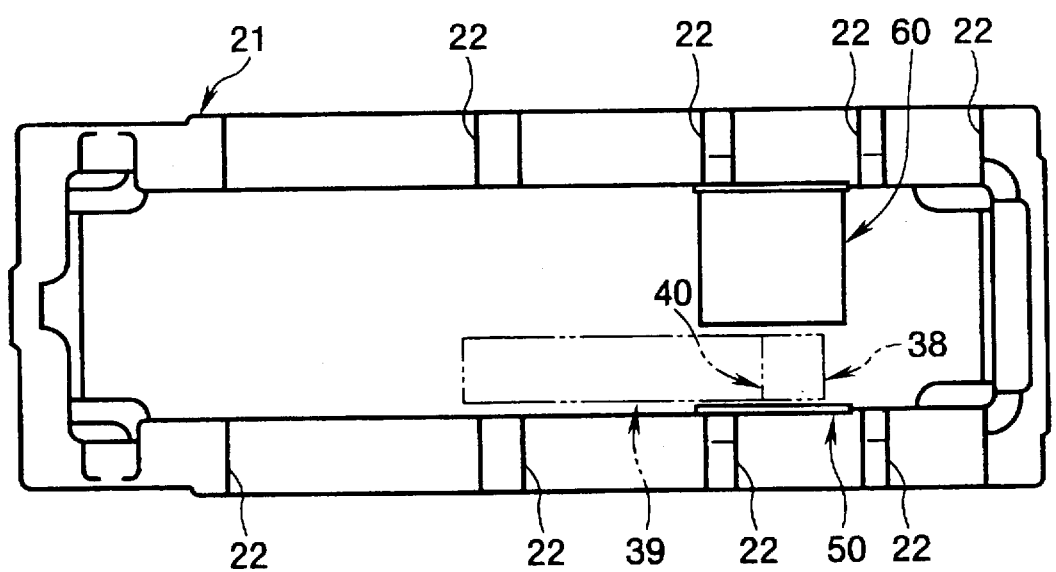
FIG. 4 is a plan view of the lower housing of one embodiment of the speed change gear device.
Figure 5:
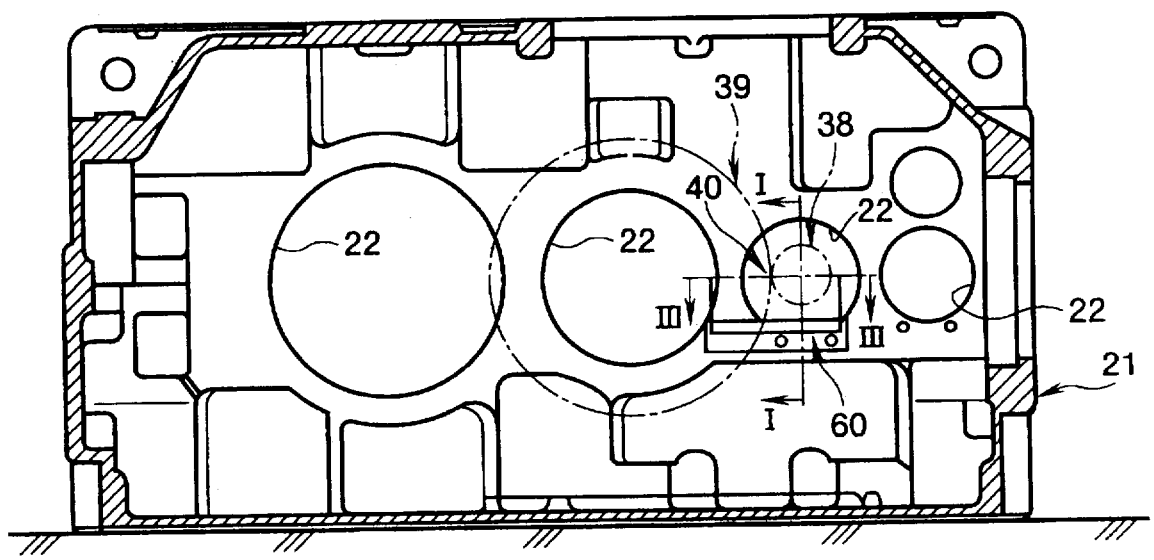
FIG. 5 is a vertical sectional view of the speed change gear device.

As illustrated in FIGS. 4 and 5, the (lower) housing 21 constructed of a split mold has a plurality of shaft holes 22 which are formed so as to horizontally penetrate the housing. Bearings (not shown in FIG. 4 or 5) are snugly fitted in the individual shaft holes 22, and onto both ends of each gear shaft (not shown in FIG. 4 or 5). The shafts are extended horizontally, arrayed side by side and rotatably supported in the bearings, respectively.

As shown in the figures, the gear shaft 30 which has both ends rotatably supported in the respective bearings 32A and 32B, is snugly fitted in the shaft holes 22, and one of its ends is protruded out of the housing 21. The shaft holes 22 are respectively closed with bearing covers 33 and 34, and the end of the gear shaft 30 is protruded out of the housing 21 through a penetrating hole 34a formed in the bearing cover 34. In addition, an oil seal 36 is located about a sleeve 35 on the protrusive part 30a of the gear shaft 30 and the inner circumferential surface of the penetrating hole 34a of the bearing cover 34.

A gear 38 which has smaller diameter (a helical gear in the illustrated example) is fixed on the gear shaft 30 between the bearings 32A and 32B of this shaft 30. The gear 38 is located at a position nearer to one of the bearings 32A (on the left side as viewed in FIG. 1 or 3). Gear 38 is held in mesh with a gear 39, which has larger diameter and belongs to the adjacent gear shaft (not shown), at an intermeshing portion 40. Since both the gear shafts 30 (one of which is not shown) have their axes located at an identical height, the intermeshing portion 40 between the gears 38 and 39 is also located at the same height as that of the axis H1 of the gear shaft 30.

Figure 1:
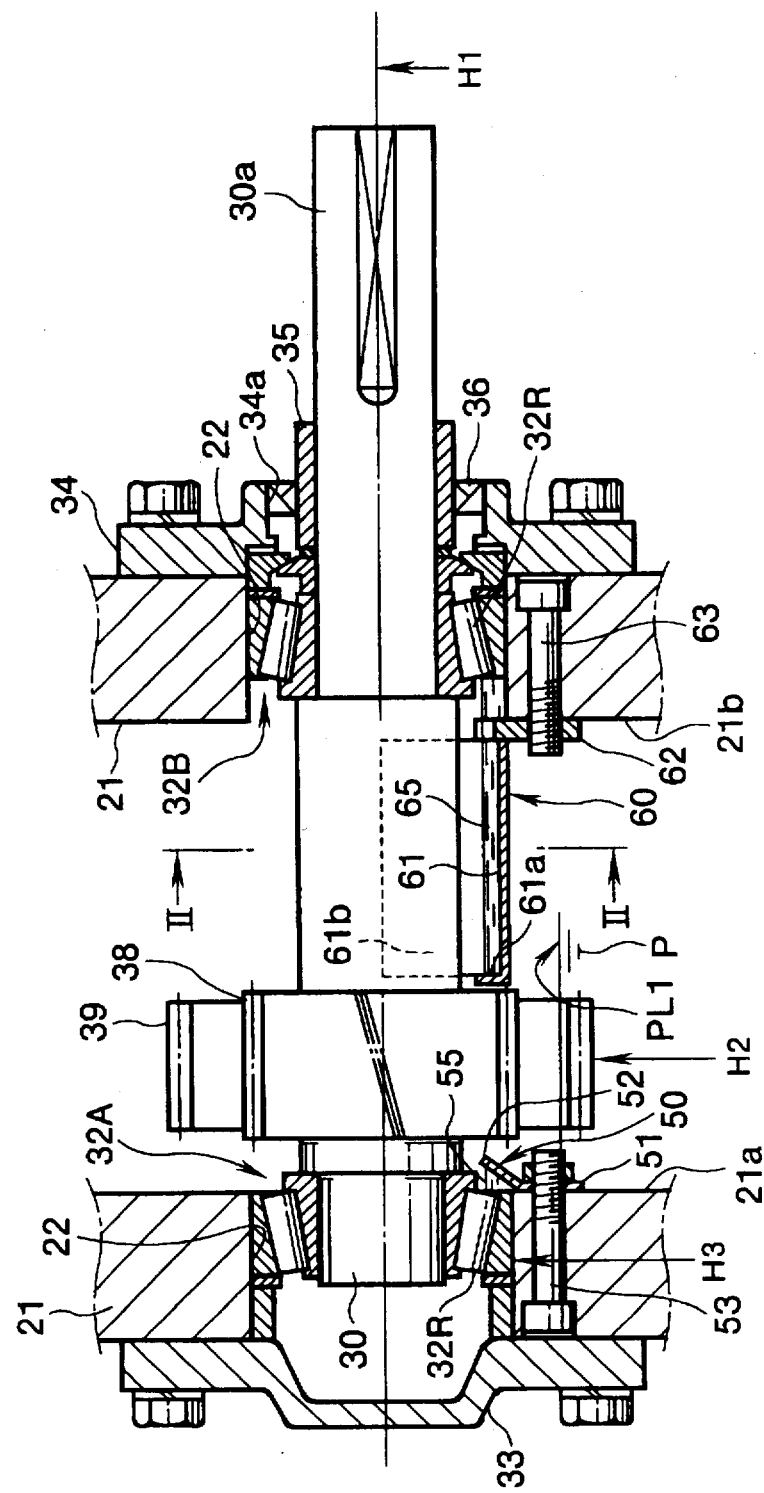
FIG. 1 is a vertical sectional view of the essential portions of a speed change gear device taken along line I—I indicated in FIG. 5, which illustrates one aspect of performance of the present invention.
Figure 2:
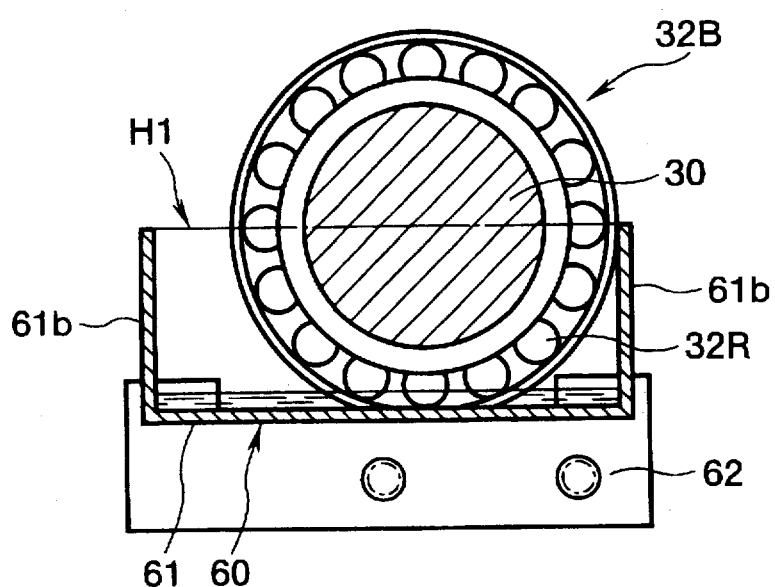
FIG. 2 is a sectional view taken along line II—II indicated in FIG. 1.
Figure 6:
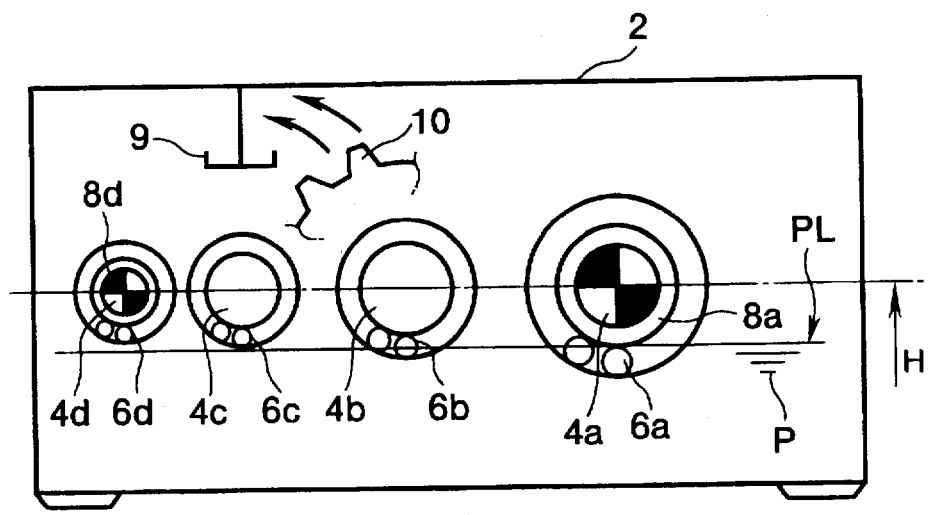
FIG. 6 is a schematic vertical view showing a reduction gear device in the prior art.

On the other hand, a collection of oil P is formed at the inside bottom of the housing 21. For the reason stated before, the oil level PL1 of the oil P is set to be higher than the lower end level H2 of the larger-diameter gear 39 and lower than the lower end level H3 of the bearings 32A and 32B. Therefore, the oil level PL1 as shown in FIG. 1 is lower than the oil-level PL shown in FIG. 6. Accordingly, the rollers 32R of the illustrated bearings 32A and 32B are not immersed in the oil P.

In order to supply the bearings 32A and 32B with oil, lubricating auxiliary vessels 50 and 60 are respectively mounted inside the housing 21. Each of the lubricating auxiliary vessels 50 and 60 is located and extended bilaterally of gears 38 and 39 respectively, so that its one end is elongated to a position at which it can catch the oil forced out sideways from the intermeshing portion 40 of the gears 38 and 39.

Figure 3:
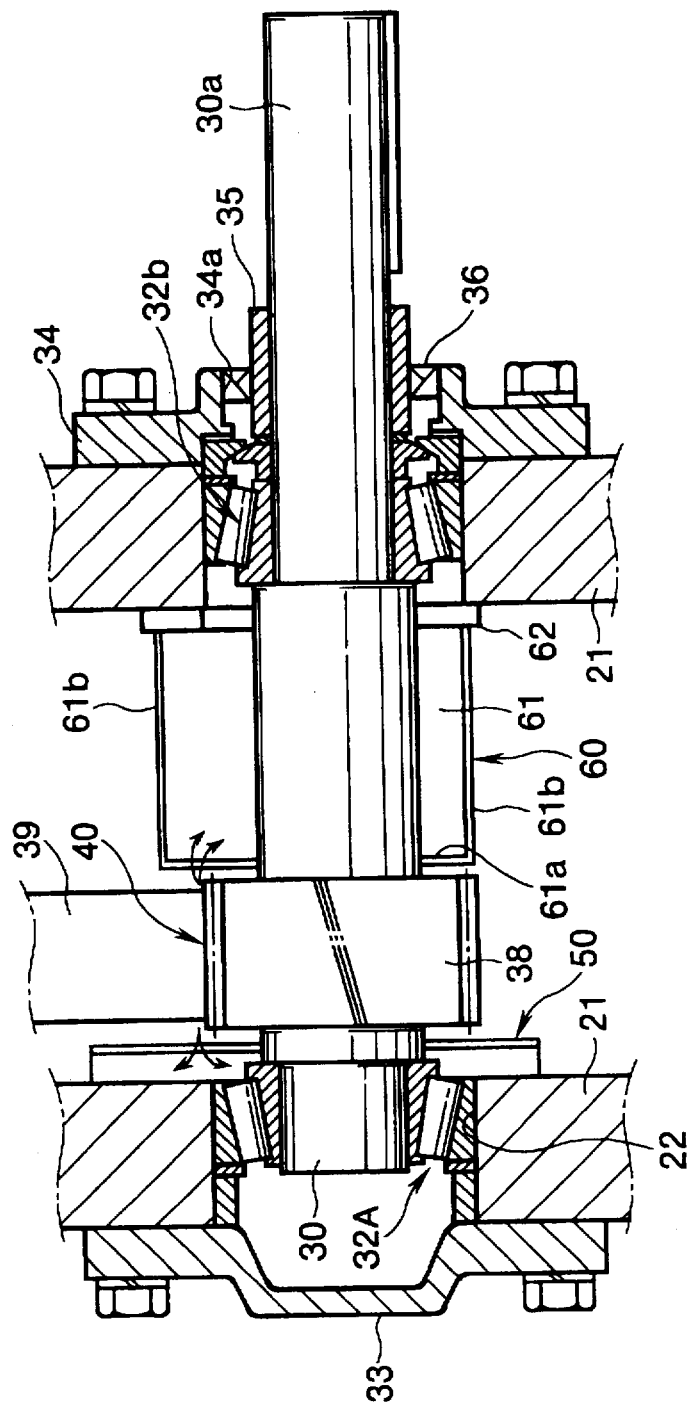
FIG. 3 is a horizontal sectional view of the essential portions of the speed change gears taken along line III—III in FIG. 5.

The lubricating auxiliary vessel 50 on the left side as viewed in FIG. 1 or 3 is attached to the inner surface 21a of the housing 21 by clamping its flange part 51 with bolt 53. This lubricating auxiliary vessel 50 is mounted below the lower end position of the bearing 32A, and defines a chute-like space of V-shaped vertical section 55 between the housing inner surface 21a and a slant plate part 52 extended upwards from the flange part 51. The chute-like space 55 is just correspondent to the position of the roller 32R at the lower end of the bearing 32A. This chute-like space 55 serves as a saucer for the oil, and is extended near to the side of the intermeshing portion 40 of the gears 38 and 39 as illustrated in FIG. 3.

The lubricating auxiliary vessel 60 on the right side as viewed in FIG. 1 or 3 is also attached to the inner surface 21b of the housing 21 by clamping its flange part 62 with bolt 63. This lubricating auxiliary vessel 60 includes a catch plate part 61 of large horizontal area. The periphery of the catch plate part 61 is enclosed in the three directions thereof with a front wall 61a and both side walls 61b, 61b. A space 65 serving as a saucer for the oil is secured on the catch plate part 61 by the walls in the three directions and the housing inner surface 21b. The position of the space 65 corresponds to that of the roller 32R at the lower end of bearing 32B. Incidentally, the side walls 61b are higher than the front wall 61a.

Herein, the front end of the catch plate part 61 is extended near to the side of the intermeshing portion 40 of the gears 38 and 39, so that the oil forced out of the intermeshing portion 40 of the gears 38 and 39 drops onto the catch plate part 61.

Next, the operation of this aspect of performance will be described.

With the rotation of gear 39, oil from the collection of oil P adheres onto the tooth surface of this gear 39. Subsequently, as the gears 38 and 39 mesh with each other, the oil adherent to the tooth surface is forced out sideways from the intermeshing portion 40. Since the lubricating auxiliary vessels 50 and 60 lie laterally of the intermeshing portion 40 of gears 38 and 39, the oil forced out is caught by the lubricating auxiliary vessels 50 and 60 and is supplied to the respective bearings 32A and 32B which are not immersed in the collection of oil P. Herein, the oil is forced out of the intermeshing portion 40 not only when the gears 38 and 39 are rotating slow, but also when they are rotating fast. Therefore, sufficient quantities of oil are always supplied to the bearings 32A and 32B independently of the rotational speeds of the gears 38 and 39, so that the lubricating performance of these bearings is enhanced.

Incidentally, both bearings 32A and 32B of shaft 30 need not always be lubricated by the same type of lubricating auxiliary vessels 50 and 60.

Figure 4A:
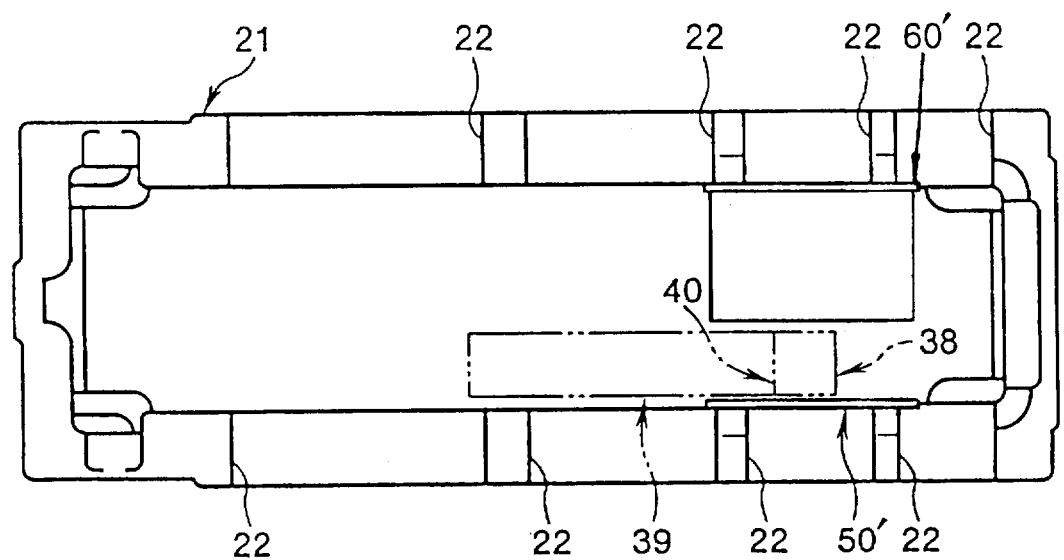
FIG. 4A is a plan view similar to FIG. 4 showing another embodiment.

In the case where the lubricating oil needs to be introduced into two adjacent bearings, the auxiliary vessel can be constructed longer to accommodate the additional bearing such as vessels 50' and 60' shown in FIG. 4A. Thus, at least two bearings can be lubricated adequately with the oil captured in the same auxiliary vessel. This will reduce the number of auxiliary vessels necessary in the unit.

As described above, the present invention described in claim 1 as the lubricating auxiliary vessel is mounted at a position which lies laterally and below the intermeshing portion of gears. Therefore, bearings which are not immersed in the collection of oil can be supplied with sufficient quantities of oil even during the low-speed rotation of the gear. The resultant level of the collection of oil is held at a low position and the lubrication of the bearings is enhanced.

According to the present invention defined in claim 2, the sufficient quantities of oil can be supplied to the bearings at both the ends of a gear shaft by auxiliary vessels for lubrication.

According to the present invention defined in claim 3 or 4, the sufficient quantities of oil can be supplied to the plurality of bearings, for example, the adjacent bearings by the single auxiliary vessel for lubrication.

What is claimed is:

1. A speed change gear device having gears with portions intermeshed with each other, gear shafts which are horizontally placed and laterally positioned at the same level in positions where said gear shafts are held respectively, bearings located on both sides of each gear for rotatably supporting the respective gear shafts, and a housing which accommodates the gear shafts and bearings at the same level, said speed change gear device comprising:

a collection of oil for lubrication inside a bottom of said housing, wherein the level of said collection of oil is set at a height below said gear shafts and bearings at which the lower end of at least one of said gears is immersed in the oil; and at least one lubricating auxiliary vessel for catching oil scooped up from said collection of oil by rotation of said immersed at least one of said gears and forced out of the intermeshing portions, and for introducing the caught oil into at least one of said bearings which is not directly immersed in said collection of oil;

wherein said at least one lubricating auxiliary vessel is mounted at a position which lies laterally adjacent to and vertically below the intermeshing portions of said gears so as to catch said forced out oil.

2. A speed change gear device as defined in claim 1, wherein said at least one lubricating auxiliary vessel includes two lubricating auxiliary vessels which are respectively mounted bilaterally of said gear intermeshing portions, and which introduce the caught oil into the respective bearings located on both sides of said immersed at least one of said gears.

3. A speed change gear device as defined in claim 2, wherein at least one of said two lubricating auxiliary vessels is mounted so as to introduce the caught oil into at least two laterally adjacent bearings of said bearings.

4. A speed change gear device as defined in claim 1, wherein said at least one lubricating auxiliary vessel is mounted so as to introduce said caught oil into at least two laterally adjacent bearings of said bearings.

* * * * *